United States Patent
Ando et al.

(10) Patent No.: US 8,376,258 B2
(45) Date of Patent: Feb. 19, 2013

(54) WEBBING TAKE-UP DEVICE

(75) Inventors: Takayoshi Ando, Aichi-ken (JP); Teruhiko Koide, Aichi-ken (JP); Masafumi Tsujimoto, Aichi-ken (JP)

(73) Assignee: Kabushiki Kaisha Tokai-Rika-Denki-Seisakusho, Aichi-Ken (JP)

( * ) Notice: Subject to any disclaimer, the term of this patent is extended or adjusted under 35 U.S.C. 154(b) by 98 days.

(21) Appl. No.: 12/904,955

(22) Filed: Oct. 14, 2010

(65) Prior Publication Data

US 2011/0089280 A1    Apr. 21, 2011

(30) Foreign Application Priority Data

Oct. 20, 2009  (JP) ................................. 2009-241443

(51) Int. Cl.
B65H 75/48    (2006.01)
(52) U.S. Cl. .................. 242/374; 242/375.1; 242/394.1
(58) Field of Classification Search .................. 242/374, 242/375.1, 390, 390.8–390.9, 394, 394.1
See application file for complete search history.

(56) References Cited

U.S. PATENT DOCUMENTS

| | | | |
|---|---|---|---|
| 6,431,485 B2 * | 8/2002 | Mitsuo et al. | ................. 242/372 |
| 7,775,473 B2 | 8/2010 | Mori | |
| 2010/0264245 A1 * | 10/2010 | Ando | ............................ 242/390 |

FOREIGN PATENT DOCUMENTS

| | | | | |
|---|---|---|---|---|
| EP | 1886883 A1 | * | 2/2008 | .................... 242/390 |
| JP | 2009298215 A | * | 12/2009 | .................... 242/390 |
| JP | 2010253969 A | * | 11/2010 | .................... 242/390 |
| JP | 2010253970 A | * | 11/2010 | .................... 242/390 |
| WO | 2006/123750 A1 | | 11/2006 | |

* cited by examiner

*Primary Examiner* — Sang Kim

(74) *Attorney, Agent, or Firm* — Roberts Mlotkowski Safran & Cole P.C.

(57) ABSTRACT

A webbing take-up device enabling a reduction in size of an overload release mechanism and easy adjustment of an operation torque of the overload release mechanism is provided. In the overload release mechanism of this webbing take-up device, rotary force of a large diameter gear is transmitted to a small diameter gear via plural annular friction springs. The friction springs are disposed between an inner periphery face of a main body portion of the large diameter gear and a tubular portion of the small diameter gear, side by side along an axial direction of the two gears. Consequently, a radial direction enlargement of the large diameter gear and small diameter gear due to space for disposing the friction springs may be restrained. Moreover, the operation torque of the overload release mechanism may be adjusted stepwise by changing the number of the friction springs to be used, in accordance with requirements.

9 Claims, 9 Drawing Sheets (A)

(B)

WEBBING TAKE-UP DEVICE

CROSS-REFERENCE TO RELATED APPLICATION

This application claims priority under 35 USC 119 from Japanese Patent Application No. 2009-241443 filed Oct. 20, 2009, the disclosure of which is incorporated by reference herein.

BACKGROUND OF THE INVENTION

1. Field of the Invention

The present invention relates to a webbing take-up device that takes up and accommodates a webbing for occupant restraint on a take-up spool, and more particularly to a webbing take-up device capable of turning the take-up spool with driving force of a motor.

2. Related Art

A webbing take-up device is disclosed in, for example, WO2006-123750. In this webbing take-up device, a motive power transmission mechanism (a deceleration mechanism) is provided between a take-up spool and a motor. The motive power transmission mechanism includes a torque limiter mechanism (an overload release mechanism). This torque limiter mechanism includes a large diameter side gear that is turned by driving force of the motor, and a small diameter side gear that is disposed at an inner side of the large diameter side gear and turns interlockingly with the spool. A plural number of limit springs are assembled, side by side in a circumferential direction, to an outer periphery portion of the small diameter side gear. The limit springs have structures that engage with protrusions/depressions formed at an inner periphery portion of the large diameter side gear. Relative rotations between the large diameter side gear and the small diameter side gear are allowed by resilient deformation of the limit springs.

Now, in a webbing take-up device as described above, for reasons such as the need to improve a degree of freedom of layout when the overload release mechanism is disposed at the deceleration mechanism and the like, a reduction in size of the overload release mechanism has been required. There have also been required for that it be made possible to easily adjust an operation torque of the overload release mechanism (a torque required for relatively turning the large diameter side gear and the small diameter side gear) in accordance with changes in the layout as mentioned above.

SUMMARY OF THE INVENTION

In consideration of the above circumstances, an object of the present invention is to provide a webbing take-up device that both enables a reduction in size of an overload release mechanism and enables easy adjustment of the operation torque of an overload release mechanism.

A webbing take-up device of a first aspect includes: a take-up spool that takes up a webbing for vehicle occupant restraint; a motor; and an overload release mechanism that is interposed between the take-up spool and the motor, wherein the overload release mechanism includes: a first rotating body that is rotated interlockingly with one of the take-up spool or the motor; a second rotating body that is provided coaxially with the first rotating body and relatively rotatably with respect to the first rotating body, and that is rotated interlockingly with the other of the take-up spool or the motor, an inner periphery portion of the second rotating body opposing an outer periphery portion of the first rotating body; and a plurality of friction springs that are each formed by a spring member in an annular shape, that are disposed between the outer periphery portion of the first rotating body and the inner periphery portion of the second rotating body and side by side along an axial direction of the first and the second rotating bodies, that suppress relative rotation with respect to one of the first rotating body or the second rotating body by friction generated between the friction springs and the one of the first rotating body or the second rotating body, and that prevents relative rotation with respect to the other of the first rotating body or the second rotating body by engaging with the other of the first rotating body or the second rotating body.

In the webbing take-up device of the first aspect, the overload release mechanism is provided with the first rotating body, which is turned interlockingly with the one of the take-up spool or the motor, and the second rotating body, which is turned interlockingly with the other of the take-up spool or the motor. The plural friction springs are provided between the first rotating body and the second rotating body. Rotary force is transmitted between the first rotating body and the second rotating body via these friction springs. Thus, rotation of the motor is transmitted to the take-up spool and the take-up spool is turned.

When a relative rotary force acts between the first rotating body and the second rotating body, which relative rotary force is above a maximum static friction force generated between the one of the first rotating body or the second rotating body and the plural friction springs, the plural friction springs relatively turn with respect to the one of the first rotating body or the second rotating body, and the first rotating body and second rotating body relatively rotate. Therefore, the take-up spool can turn independently of the motor.

Now, in this webbing take-up device, a torque required for relatively rotating the first rotating body and the second rotating body (the operation torque of the overload release mechanism) can be adjusted by changing the number of friction springs in accordance with requirements. Therefore, adjustment of the operation torque of the overload release mechanism can be made simpler. Furthermore, the plural friction springs, which are formed in annular shapes, are disposed side by side along the axial directions of both of the first rotating body and the second rotating body, between the outer periphery portion of the first rotating body and the inner periphery portion of the second rotating body. Therefore, a radial direction enlargement of the first rotating body and the second rotating body due to space for disposing the friction springs may be restrained. Hence, the overload release mechanism may be reduced in size.

A webbing take-up device of a second aspect is the webbing take-up device of the first aspect in which the plurality of friction springs include a pair of coil springs, helix orientations of which are set to mutually opposite orientations, and the pair of coil springs receiving forces in directions approaching one another due to friction with the one of the first rotating body or the second rotating body during relative rotation in one direction around the axis with respect to the one of the first rotating body or the second rotating body.

In the webbing take-up device of the second aspect, when the pair of coil springs whose helix orientations are set to opposite orientations from one another relatively turn in the one direction around the axis with respect to the one of the first rotating body or the second rotating body, because of friction between the one of the first rotating body or the second rotating body and the pair of coil springs, the pair of coil springs are subject to forces in directions such that the pair of coil springs approach one another. Therefore, the pair of coil springs may be closely contacted with one another and the forces acting on the two coil springs counteract. Thus, mispositioning of the coil springs in the axial direction relative to the one of the first rotating body or the second rotating body may be prevented or suppressed.

In the above first and the second aspect, it is possible that a plurality of protruding portions are provided at the other of the first rotating body or the second rotating body, the protruding portions protruding in radial directions of the other of the first rotating body or the second rotating body and being respectively disposable between one end portions in a circumferential direction of the friction springs and the other end portions in the circumferential direction of the friction springs.

A webbing take-up device of a third aspect includes: a take-up spool that takes up a webbing for vehicle occupant restraint; a motor; and an overload release mechanism that is interposed between the take-up spool and the motor, wherein the overload release mechanism includes: a first rotating body that is rotated interlockingly with one of the take-up spool or the motor; a second rotating body that is provided coaxially with the first rotating body and relatively rotatably with respect to the first rotating body, and that is rotated interlockingly with the other of the take-up spool or the motor, an inner periphery portion of the second rotating body opposing an outer periphery portion of the first rotating body; and a friction spring that is formed by a spring member in an annular shape, that is disposed between the outer periphery portion of the first rotating body and the inner periphery portion of the second rotating body, that suppresses relative rotation with respect to one of the first rotating body or the second rotating body by friction generated between the friction spring and the one of the first rotating body or the second rotating body, and that prevents relative rotation with respect to the other of the first rotating body or the second rotating body by engaging with the other of the first rotating body or the second rotating body, wherein a plurality of friction springs can be disposed between the outer periphery portion of the first rotating body and the inner periphery portion of the second rotating body side by side along an axial direction of the first and the second rotating bodies.

In the webbing take-up device of the third aspect, the overload release mechanism is provided with the first rotating body, which is turned interlockingly with the one of the take-up spool or the motor, and the second rotating body, which is turned interlockingly with the other of the take-up spool or the motor. The friction spring(s) is/are provided between the first rotating body and the second rotating body. Rotary force is transmitted between the first rotating body and the second rotating body through the friction spring(s). Thus, rotation of the motor is transmitted to the take-up spool and the take-up spool is turned.

When a relative rotary force acts between the first rotating body and the second rotating body, which relative rotary force is above a maximum static friction force generated between the one of the first rotating body or the second rotating body and the friction spring, the friction spring relatively turns with respect to the one of the first rotating body or the second rotating body, and the first rotating body and second rotating body relatively turn. Therefore, the take-up spool can turn independently of the motor.

In this webbing take-up device, the friction springs may be plurally disposed between the outer periphery portion of the first rotating body and the inner periphery portion of the second rotating body. Therefore, a torque required for relatively rotating the first rotating body and second rotating body (the operation torque of the overload release mechanism) can be adjusted by changing the number of friction springs in accordance with requirements. Therefore, adjustment of the operation torque of the overload release mechanism can be made simpler. Furthermore, the plural friction springs formed in annular shapes can be disposed side by side along the axial directions of both of the first rotating body and the second rotating body, between the outer periphery portion of the first rotating body and the inner periphery portion of the second rotating body. Therefore, a radial direction enlargement of the first rotating body and the second rotating body due to space for disposing the friction springs may be restrained. Hence, the overload release mechanism may be reduced in size.

A webbing take-up device of a fourth aspect is the webbing take-up device of any of the first to third aspects in which at least one protruding portion is provided at the other of the first rotating body or the second rotating body, the protruding portion protruding in a radial direction of the other of the first rotating body or the second rotating body and being disposable between one end portion(s) in a circumferential direction of the friction spring(s) and the other end portion(s) in the circumferential direction of the friction spring(s).

In the webbing take-up device of the fourth aspect, relative rotation of the friction spring with respect to the other of the first rotating body or the second rotating body is impeded by the protruding portion disposed between the circumferential direction one end portion and the circumferential direction other end portion of the friction spring abutting against the circumferential direction one end portion or the circumferential direction other end portion of the friction spring. Furthermore, in a case where the protruding portion is plurally provided, the plural protruding portions may be assigned one-to-one to the plural friction springs. Hence, a load inputted to the other of the first rotating body or the second rotating body from the friction springs during the relative rotation can be distributed between the plural protruding portions.

A webbing take-up device of a fifth aspect is the webbing take-up device of any of the first to fourth aspects in which each of the friction springs is formed from a linear spring member.

In the webbing take-up device of the fifth aspect, because the annular friction spring is formed from linear spring member, a space for disposing the plural friction springs may be kept small when the plural friction springs are disposed between the first rotating body and the second rotating body side by side along the axial direction thereof.

The spring member of the fifth aspect is not limited to a member with a circular cross-section (a wire-form member); the member with cross-section in square shape and the like may be used. If the cross-section of a spring member is a square shape, more cross-sectional area may be assured than with circular cross-section. Therefore, a torque generated between the one of the first rotating body or second rotating body and the friction spring may be more easily assured. Moreover, because a contact area between the one of the first rotating body or second rotating body and the friction spring is larger, surface pressure between the two is reduced and resistance to abrasion is improved.

In the above aspects, it is possible that relative rotation with respect to the other of the first rotating body or the second rotating body is prevented by the one end portion in the circumferential direction of the friction spring or the other end portion in the circumferential direction of the friction spring abutting against the at least one protruding portion.

As described above, in a webbing take-up device relating to the present invention, the overload release mechanism may be reduced in size and the operation torque of the overload release mechanism may be easily adjusted.

BRIEF DESCRIPTION OF THE DRAWINGS

Embodiments of the invention will be described in detail with reference to the following figures, wherein.

DETAILED DESCRIPTION OF THE INVENTION

First Exemplary Embodiment

Herebelow, a webbing take-up device 10 relating to a first exemplary embodiment of the present invention is described with reference to FIG. 1 to FIG. 4.

Figure 1:
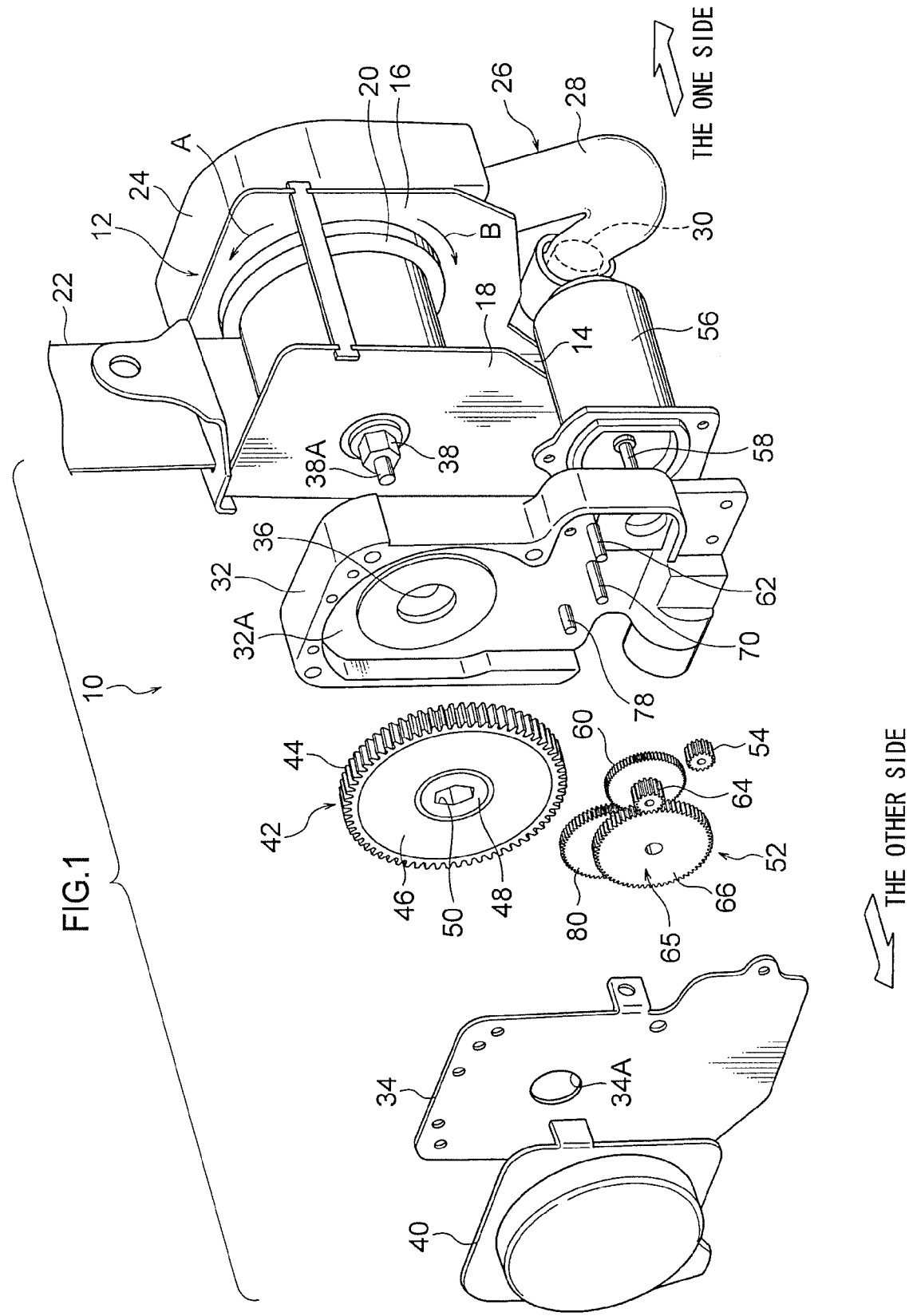
FIG. 1 is a schematic exploded perspective diagram illustrating overall structure of a webbing take-up device relating to a first exemplary embodiment of the present invention.

As illustrated in FIG. 1, the webbing take-up device 10 includes a frame 12 that constitutes a support member. The frame 12 includes a plate-form rear plate 14. The rear plate 14 is fixed to a vehicle body in the vicinity of, for example, a lower end portion of a center pillar of the vehicle, by unillustrated fastening members such as bolts or the like. Thus, this webbing take-up device 10 is attached to the vehicle body. A pair of leg plates 16 and 18, which oppose one another substantially in a vehicle front and rear direction, are extended in parallel from two width direction ends of the rear plate 14. A take-up spool 20, which is formed in a substantially circular tube shape, is disposed between the leg plates 16 and 18.

The axial direction of the take-up spool 20 is set to the direction of opposition of the leg plates 16 and 18, and the take-up spool 20 is made rotatable around its own axis. A length direction base end portion of a long belt-form webbing 22 is anchored at the take-up spool 20. By the take-up spool 20 rotating in a take-up direction (the direction of arrow A in FIG. 1), which is one way around the axis thereof, the webbing 22 is taken up from the base end side thereof onto an outer periphery portion of the take-up spool 20 in layers, and is stowed. When the webbing 22 is pulled from a distal end side thereof, the webbing 22 that has been taken up onto the take-up spool 20 is unwound. In accordance therewith, the take-up spool 20 rotates in an unwinding (pull-out) direction which is opposite to the take-up direction (the direction of arrow B in FIG. 1).

An unillustrated torsion shaft is disposed inside the take-up spool 20, coaxially with the take-up spool 20. An axial direction one end portion of the torsion shaft (the end portion at the side of the leg plate 18) is coupled to the take-up spool 20 to be relatively non-rotatable, and the axial direction other end side passes through a through-hole formed in the leg plate 16 and protrudes to one side of the leg plate 16 (the opposite side of the leg plate 16 from the side at which the take-up spool 20 is disposed).

A sensor cover 24 made of resin is attached to the one side of the leg plate 16. The sensor cover 24 is formed in a box shape that is open to the leg plate 16 side thereof. The axial direction other end side of the torsion shaft enters into the interior of the sensor cover 24, and is turnably supported at an unillustrated bearing portion provided in the sensor cover 24. A widely known locking mechanism, which is not illustrated, is accommodated in the interior of the sensor cover 24. This locking mechanism restricts rotation of the torsion shaft in the unwinding direction during a sharp deceleration of the vehicle or the like.

A pretensioner mechanism 26 is also provided at the one side of the leg plate 16. This pretensioner mechanism 26 includes a cylinder 28, which is fixed to the leg plate 16. A gas generator 30 is accommodated at a lower end portion of the cylinder 28. When an unillustrated ignition device operates, this gas generator 30 produces high-pressure gas into the cylinder 28. An unillustrated piston is accommodated in the inside of the cylinder 28. When the gas is produced into the cylinder 28, this piston protrudes from the cylinder 28 and forcibly turns the torsion shaft in the take-up direction.

A clutch housing 32 that constitutes a support member is attached to the other side of the leg plate 18 (the opposite side thereof from the side at which the take-up spool 20 is disposed). The clutch housing 32 is formed in a box shape that is open toward the opposite side thereof from the side at which the leg plate 18 is disposed, and the opening portion is closed off by a cover 34. A circular through-hole 36 is formed in a side wall portion 32A of the clutch housing 32. This through-hole 36 is disposed to be concentric with the take-up spool 20, and an adapter 38 is disposed at the inside of the through-hole 36. This adapter 38 is formed in a hexagonal rod shape. The adapter 38 passes through a through-hole formed in the leg plate 18, and is fixed to the axial direction one end portion of the torsion shaft, coaxially therewith. Consequently, the adapter 38 rotates integrally with the torsion shaft and the take-up spool 20.

A circular rod-shaped shaft portion 38A is coaxially and integrally provided at this adapter 38. The shaft portion 38A protrudes to the opposite side of the adapter 38 from the side thereof at which the take-up spool 20 is disposed. This shaft portion 38A passes through a through-hole 34A formed in the cover 34 and protrudes to the other side of the cover 34 (the opposite side of the cover 34 from the side at which the clutch housing 32 is disposed).

A spring cover 40 made of resin is provided at the other side of the cover 34. This spring cover 40 is formed substantially in the shape of a circular tube with a floor, with the cover 34 side thereof being open. The spring cover 40 is attached to the leg plate 18 via the clutch housing 32. The shaft portion 38A of the adapter 38 is inserted into the interior of the spring cover 40, and the shaft portion 38A is turnably supported by an unillustrated bearing portion provided in the spring cover 40.

An unillustrated spiral spring is accommodated in the interior of the spring cover 40. A spiral direction outer side end portion of this spiral spring is anchored at the spring cover 40, and a spiral direction inner side end portion is anchored at the shaft portion 38A. This spiral spring urges the take-up spool 20 in the take-up direction, via the adapter 38 and the torsion shaft.

A clutch 42 is accommodated in the interior of the above-mentioned clutch housing 32. The clutch 42 includes a gear wheel 44. This gear wheel 44 is formed in the shape of a circular tube with a floor, with a short axial direction dimension and the other side thereof (the cover 34 side) being open. The opening portion of the gear wheel 44 is closed off by a circular disc-form cover 46. Outer teeth are formed at an outer periphery portion of the gear wheel 44. These outer teeth correspond with a gear 80, which is mentioned below.

A substantially circular tube-shaped ratchet 48 is disposed at the inside of the gear wheel 44 to be coaxial with the gear wheel 44. An axial direction one end portion of the ratchet 48 is axially supported to be rotatable at a circular hole formed in the gear wheel 44, and an axial direction other end portion is axially supported to be rotatable at a circular hole formed in the cover 46. Thus, the ratchet 48 is made relatively rotatable with respect to the gear wheel 44 and the cover 46.

A fitting hole 50 with a hexagonal cross-section is formed in an axial center portion of the ratchet 48. The adapter 38 fits into this fitting hole 50. Thus, the ratchet 48 and the take-up spool 20 are relatively non-rotatably coupled, and the gear wheel 44 and the cover 46 are supported at the adapter 38 via the ratchet 48. Plural ratchet teeth are formed with a constant pitch on an outer periphery portion of the ratchet 48.

A pawl that swings due to, for example, centrifugal force, is accommodated at a radial direction outer side of the ratchet 48. This pawl is supported at the gear wheel 44, and meshes with the ratchet teeth of the ratchet 48 when the gear wheel 44 turns in the take-up direction. Thus, the gear wheel 44 and the ratchet 48 are mechanically coupled, and the clutch 42 is in a coupled state. This pawl disengages the state of meshing with the ratchet 48 when the gear wheel 44 turns in the unwinding direction. Thus, the state of coupling of the gear wheel 44 and the ratchet 48 is released, and the clutch 42 is in a disengaged state.

A speed reduction (deceleration) gear train 52 is accommodated at the inside of the above-mentioned clutch housing 32. The speed reduction gear train 52 includes a spur gear 54. The gear 54 is accommodated inside the clutch housing 32 in a state in which the axial direction thereof is aligned with the axial direction of the take-up spool 20.

The gear 54 is fixed to an output shaft 58 of a motor 56 to which the clutch housing 32 is attached. A spur gear 60 with a larger diameter than the gear 54 is provided to sideward in a rotation radius direction of the gear 54. A support shaft 62 is formed at the clutch housing 32 to correspond with the gear 60. An axial direction of the support shaft 62 is aligned with the axial direction of the take-up spool 20, and the gear 60 is rotatably supported at the support shaft 62 in a state of meshing with the gear 54.

A spur gear 64 with a smaller diameter than the gear 60 is formed, coaxially and integrally with the gear 60, to sideward in the axial direction of the gear 60. A large diameter gear 66 (the second rotating body) with a larger diameter than the gear 64 is provided to sideward in the rotation radius direction of the gear 64. This large diameter gear 66 structures an overload release mechanism 65 (a torque limiter mechanism).

Figure 2:
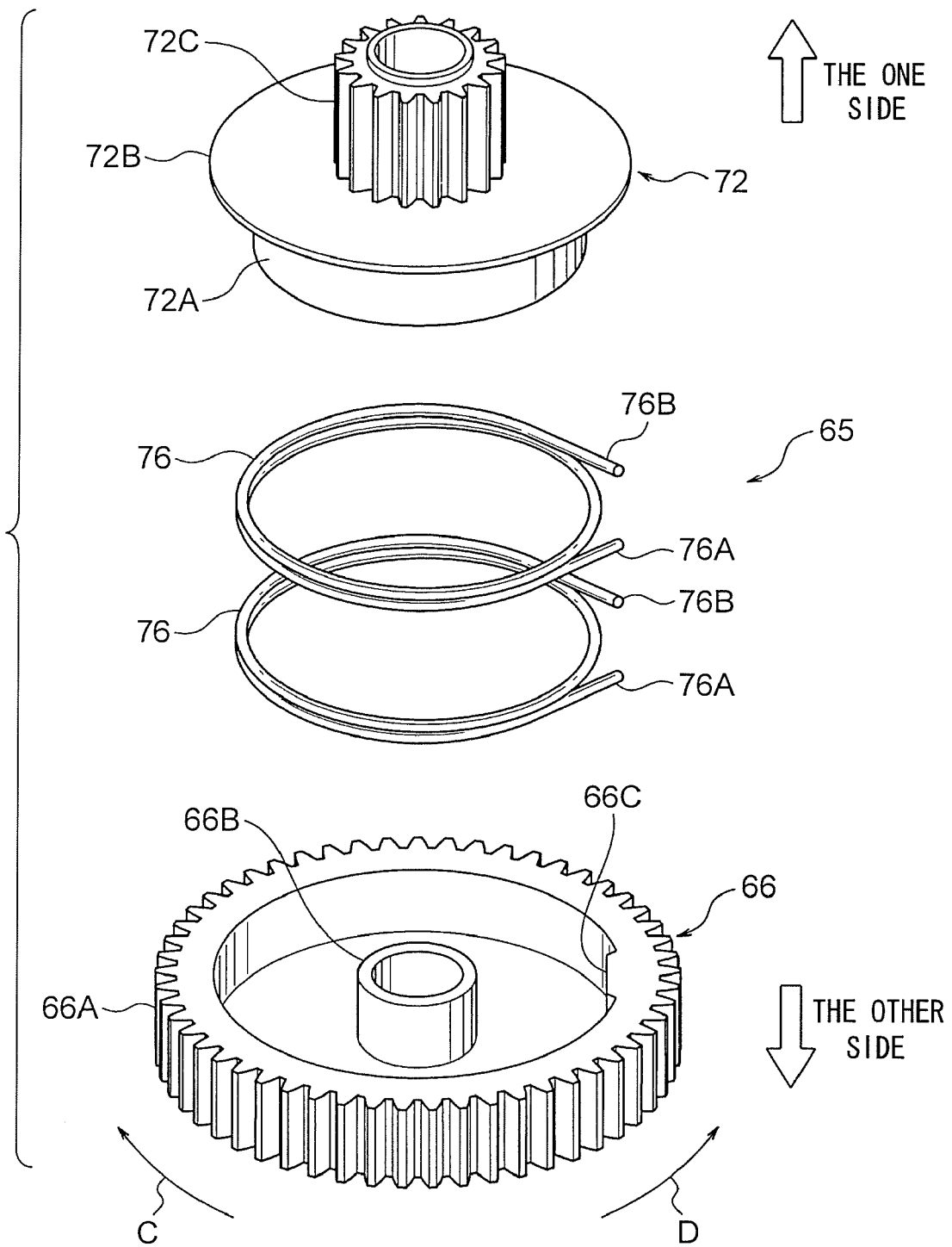
FIG. 2 is an exploded perspective diagram illustrating structure of an overload release mechanism, which is a structural member of the webbing take-up device relating to the first exemplary embodiment of the present invention.
Figure 3:
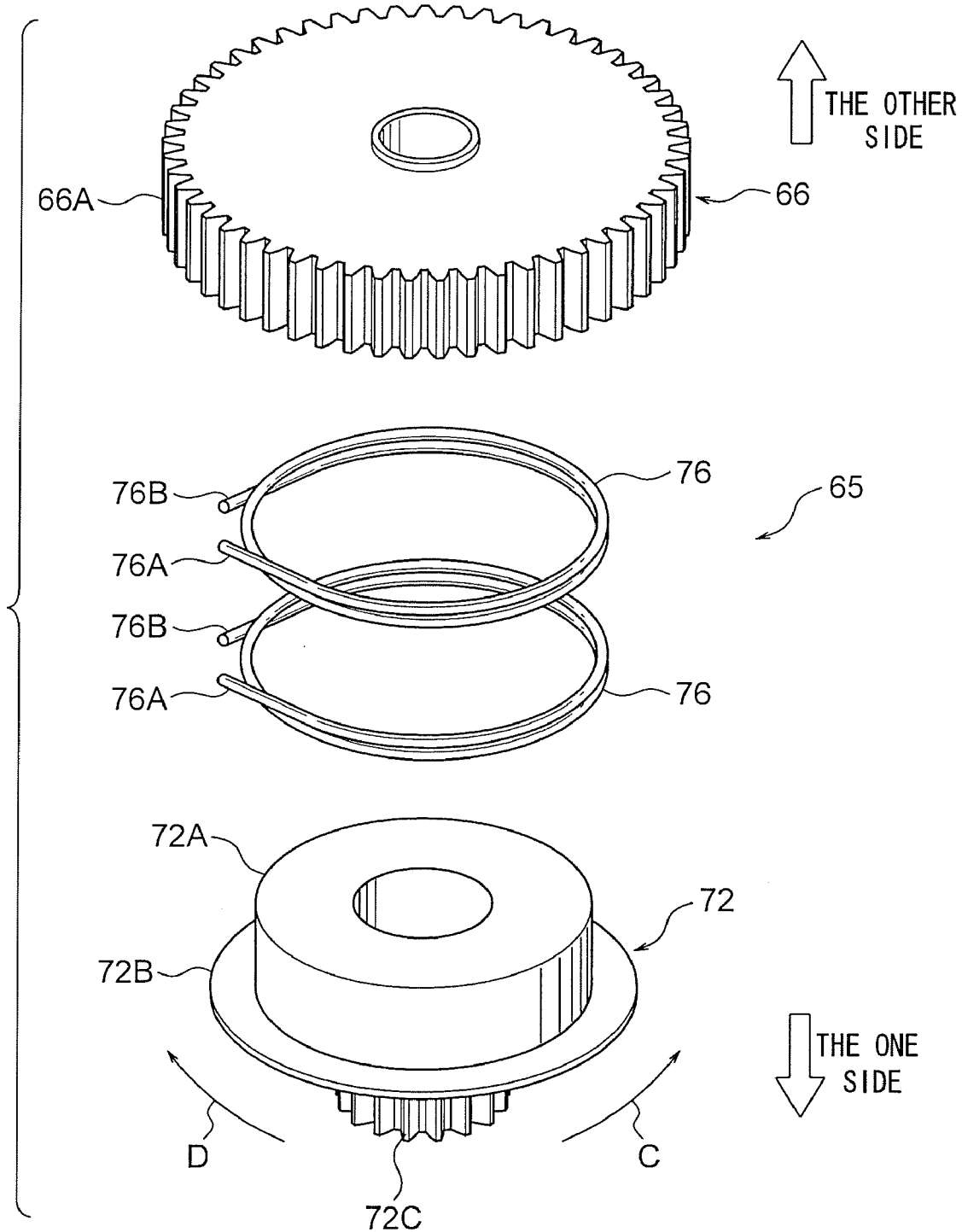
FIG. 3 is an exploded perspective diagram of the overload release mechanism illustrated in FIG. 2, viewed from a different angle from FIG. 2.

As illustrated in FIG. 2 and FIG. 3, the large diameter gear 66 includes a main body portion 66A, which is formed in the shape of a circular tube with a floor, having a floor wall at the other side (the cover 34 side) thereof. The main body portion 66A is disposed in a state in which an opening portion at the one side thereof opposes the side wall portion 32A of the clutch housing 32. A circular tube-shaped bearing portion 66B is provided at the inside of the main body portion 66A. The bearing portion 66B protrudes from the floor wall of the main body portion 66A toward the one side (the opening side) of the main body portion 66A, and is provided coaxially and integrally with the main body portion 66A. A support axis 70, which is provided at the clutch housing 32, is inserted into the inside of the bearing portion 66B. An axial direction of the support axis 70 is aligned with the axial direction of the take-up spool 20. Thus, the large diameter gear 66 is rotatably supported by the support axis 70 in a state in which spur gear outer teeth formed at the outer periphery portion of the main body portion 66A mesh with the gear 64. Thus, the large diameter gear 66 rotates interlockingly with the motor 56.

A small diameter gear 72 (the first rotating body) is disposed at the one side of the large diameter gear 66. This small diameter gear 72 includes a tubular portion 72A formed in a circular tube shape. The bearing portion 66B of the large diameter gear 66 is rotatably fitted into the inside of the tubular portion 72A. Thus, the small diameter gear 72 is supported to be coaxial with and relatively rotatable with respect to the large diameter gear 66.

A flange-form collar portion 72B is coaxially and integrally provided at the one side of the tubular portion 72A. The opening of the main body portion 66A is closed off by this collar portion 72B. A gear portion 72C, which is formed with a smaller diameter than the large diameter gear 66, is coaxially and integrally provided at the one side of the collar portion 72B. The gear portion 72C protrudes to outside (the one side) of the main body portion 66A, and spur gear outer teeth are formed at an outer periphery portion thereof.

The spur gear 80 (see FIG. 1), with a larger diameter than the gear portion 72C, is provided to sideward in a rotation radius direction of the gear portion 72C. A support shaft 78 is formed at the clutch housing 32 to correspond with the gear 80. The axial direction of the support shaft 78 is aligned with (along) the axial direction of the take-up spool 20. Thus, the gear 80 is rotatably supported at the support shaft 78 in a state of meshing with the gear portion 72C. An unillustrated spur gear is coaxially and integrally formed at the other side of the gear 80. This gear is meshed with the gear wheel 44 of the clutch 42 mentioned before. Thus, the small diameter gear 72 is turned interlockingly with the gear wheel 44, and the small diameter gear 72 is turned interlockingly with the take-up spool 20 in a state of coupling with the clutch 42.

An outer periphery face of the tubular portion 72A and an inner periphery face of the main body portion 66A oppose one another in the radial direction of the two portions, and an annular gap 74 is formed between the two portions. A plural number (in this case, two) of friction springs 76 are concentrically disposed in this gap 74. The friction springs 76 are coil springs formed by curving or bending wire-form (linear) spring members into loops (helical forms). The friction springs 76 are disposed side by side along the axial direction of the large diameter gear 66 and the small diameter gear 72. In this first exemplary embodiment, numbers of windings of the friction springs 76 are two windings.

The friction springs 76 are formed with an inner diameter dimension of the friction springs 76 when in a free state being smaller than an outer diameter dimension of the tubular portion 72A. The friction springs 76 are mounted onto the outer periphery face of the tubular portion 72A in an increased-diameter state. Consequently, the friction springs 76 are retained at the small diameter gear 72 by friction force generated between the friction springs 76 and the tubular portion 72A, and relative rotation of the friction springs 76 with respect to the small diameter gear 72 is suppressed.

Figure 4:
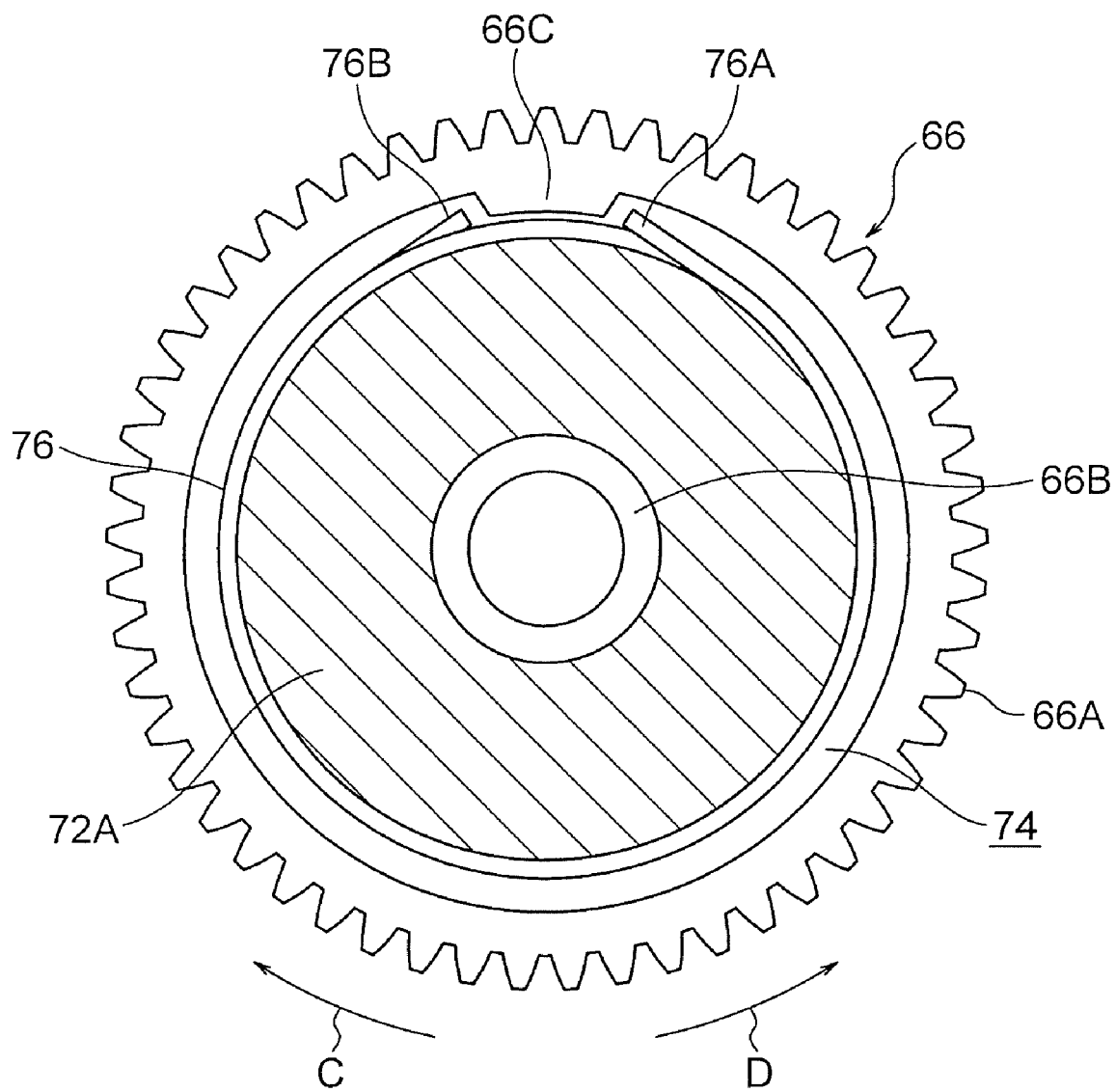
FIG. 4 is a sectional diagram of the overload release mechanism illustrated in FIG. 2 and FIG. 3.

As illustrated in FIG. 4, a protruding portion 66C that protrudes to the radial direction inner side is provided at the inner periphery portion of the main body portion 66A. This protruding portion 66C is disposed between a circumferential direction one end portion 76A and a circumferential direction other end portion 76B of each friction spring 76. Consequently, relative rotation of each friction spring 76 with respect to the large diameter gear 66 is impeded by the circumferential direction one end portion 76A or circumferential direction other end portion 76B abutting against the protruding portion 66C.

In the overload release mechanism 65 with the structure described above, when the large diameter gear 66 turns, rotary force of the large diameter gear 66 is transmitted through the friction springs 76 to the small diameter gear 72, and the small diameter gear 72 rotates to follow the large diameter gear 66. However, if a relative rotary force that acts between the large diameter gear 66 and the small diameter gear 72 exceeds a maximum static friction force that acts between the friction springs 76 and the tubular portion 72A, then the tubular portion 72A slides against the friction springs 76, and the small diameter gear 72 relatively rotates with respect to the friction springs 76 and the large diameter gear 66.

In this first exemplary embodiment, a maximum of ten of the friction springs 76 may be disposed in the gap 74 between the large diameter gear 66 and the small diameter gear 72. A maximum of five of the friction springs 76 may be mounted onto the outer periphery face of the tubular portion 72A. Thus, by changing the number of the friction springs 76 that are used, the operation torque of the overload release mechanism 65 (the torque required for relatively turning the large diameter gear 66 and the small diameter gear 72, which is hereinafter simply referred to as the operation torque) can be adjusted stepwise.

Specifically, in this first exemplary embodiment, the friction springs 76 are constituted such that an operation torque of 1 N·m is generated by each one thereof. Thus, the operation torque is increased/reduced in steps of 1 N·m when the number of the friction springs 76 being used is increased/reduced by one. For example, if one friction spring 76 is mounted on the outer periphery face of the tubular portion 72A, the operation torque is 1 N·m, and if four friction springs 76 are mounted on the outer periphery face of the tubular portion 72A, the operation torque is 4 N·m.

In this first exemplary embodiment, the number of windings of each friction spring 76 is two. However, the number of windings of friction spring may be changed in other exemplary embodiments. For example, a constitution is possible in which a number of windings of friction springs is set to three and an operation torque of 1 N·m is produced by each friction spring. In this case, if two 3-winding friction springs are used, an operation torque of 2 N·m is produced. Further, constitutions are possible in which plural friction springs with different numbers of windings are mixed together, and the constitutions of the friction springs may be suitably changed.

Next, operation of the present first exemplary embodiment is described.

In the webbing take-up device 10, when a control unit such as an ECU (electronic control unit) or the like (not illustrated) determines that a distance to an obstacle forward of the vehicle in which this webbing take-up device 10 is installed is less than a certain value, on the basis of detection results from a forward monitoring unit such as, for example, a radar ranging device, an infrared ranging device or the like (not illustrated), the control unit drives the motor 56 to forward-turn.

When the output shaft 58 is forward-turned by the forward-turning driving force of the motor 56, the forward-turning of the output shaft 58 is transmitted through the gears 54, 60 and 64 to the large diameter gear 66 of the overload release mechanism 65, and the large diameter gear 66 turns one way around the axis (the direction of arrow C in FIG. 2 to FIG. 4). As a result, the protruding portion 66C of the large diameter gear 66 abuts against the circumferential direction one end portions 76A of the plural friction springs 76, and the plural friction springs 76 turn the one way around the axis to follow the large diameter gear 66. Further, the small diameter gear 72 at which the plural friction springs 76 are mounted on the tubular portion 72A turns the one way around the axis to follow the friction springs 76 and the large diameter gear 66.

The turning of the small diameter gear 72 is transmitted through the gear 80 and the unillustrated gear to the gear wheel 44 of the clutch 42, and the gear wheel 44 is turned in the take-up direction (the direction of arrow A in FIG. 1). When the gear wheel 44 turns in the take-up direction, the unillustrated pawl attached to the gear wheel 44 meshes with the ratchet teeth of the ratchet 48, and the gear wheel 44 and the ratchet 48 are mechanically coupled. As a result, the ratchet 48 is turned in the take-up direction together with the gear wheel 44.

The ratchet 48 is coupled to the take-up spool 20 via the adapter 38 and the torsion shaft. Therefore, the take-up spool 20 is turned in the take-up direction by the ratchet 48 turning in the take-up direction, and the webbing 22 is taken up onto the take-up spool 20, from the length direction base end side thereof. As a result, a slight looseness in the webbing 22 that is applied to the body of an occupant, referred to as "slack", is eliminated and restraint of the occupant by the webbing 22 is improved.

If an excessive tension (unwinding) force acts on the webbing 22, for example, during the taking up of the webbing 22 as described above, a rotary force in the direction of the unwinding is inputted to the gear wheel 44 that is coupled to the take-up spool 20, and a rotary force the other way around the axis (the direction of arrow D in FIG. 2 to FIG. 4) is inputted to the small diameter gear 72. If this rotary force is larger than the maximum static friction force that acts between the plural friction springs 76 and the tubular portion 72A, the tubular portion 72A slides (rubs with friction) against the plural friction springs 76. Therefore, relative rotation of the small diameter gear 72 with respect to the large diameter gear 66 is allowed, and structural members that are at the motor 56 side relative to the large diameter gear 66 are cut off from the rotation of the take-up spool 20. Thus, the take-up spool 20 can turn in the unwinding direction independently of the motor 56.

In the overload release mechanism 65 of the present webbing take-up device 10, the plural friction springs 76 formed in annular shapes are disposed in the gap 74 between the large diameter gear 66 and the small diameter gear 72, side by side along the axial direction. Therefore, a radial direction enlargement of the large diameter gear 66 and small diameter gear 72 according to a space for disposing the friction springs 76 may be restrained. Thus, because the overload release mechanism 65 is reduced in size, a degree of freedom of layout when the overload release mechanism 65 is to be disposed at the speed reduction gear train 52 is improved.

In addition, the operation torque of the overload release mechanism 65 can be adjusted by changing the number of the friction springs 76 to be used in accordance with requirements. Therefore, adjustment of the operation torque of the overload release mechanism 65 when the layout is changed as mentioned above is simple.

In this first exemplary embodiment, the operation torque of the overload release mechanism 65 is provided by a friction force that acts between the plural friction springs 76 and the tubular portion 72A (the small diameter gear 72). Thus, during operation of the overload release mechanism 65, the tubular portion 72A of the small diameter gear 72 slides smoothly with respect to the plural friction springs 76. Therefore, operation noise and vibrations and the like are suppressed.

In this first exemplary embodiment, each friction spring 76 is formed by a wire-form (linear) spring member being curved into an annular shape. Therefore, a space for disposing the friction springs 76 when the plural friction springs 76 are disposed side by side along the axial direction between the large diameter gear 66 and the small diameter gear 72 may be kept small. Moreover, assembly characteristics when the friction springs 76 are being assembled to the tubular portion 72A of the small diameter gear 72 are excellent.

In this first exemplary embodiment, when the gear wheel 44 turns in the take-up direction, rotary force of the large diameter gear 66 is inputted to the circumferential direction one end portion 76A of each friction spring 76, and when the gear wheel 44 turns in the unwinding direction, the rotary force of the large diameter gear 66 is inputted to the circumferential direction other end portion 76B of the friction spring 76. Thus, the two circumferential direction end portions of the friction spring 76 are used as rotary force input portions, and consequently endurance of the friction spring 76 may be excellently assured.

Figure 9:
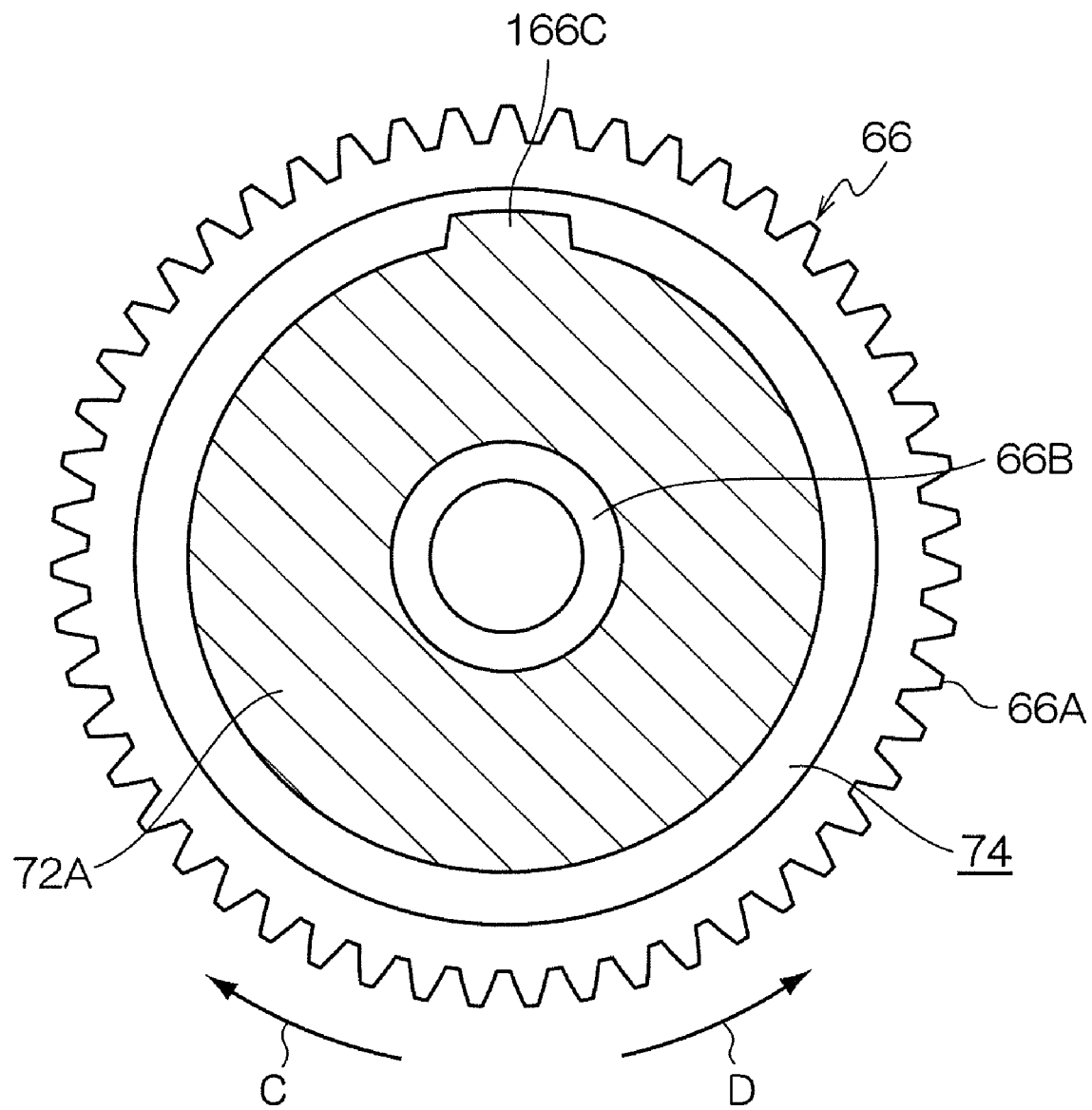
FIG. 9 is a simple sectional diagram of a modified example of the overload release mechanism illustrated in FIG. 2 and FIG. 3.

The above-described first exemplary embodiment has a structure in which frictional force is generated between the outer periphery face of the tubular portion 72A of the small diameter gear 72 and the friction springs 76. However, the present invention is not to be limited thus. A structure is possible in which frictional force is generated between the inner periphery face of the main body portion 66A of the large diameter gear 66 and friction springs. In this case, the protruding portion 66C is omitted and a protrusion or the like is needed to be provided at the small diameter gear 72 such that the friction springs do not relatively rotate with respect to the small diameter gear 72. (For example, a protruding portion 166C (see FIG. 9) such as like the protruding portion 66C may be provided at the outer periphery face of the tubular portion 72A of the small diameter gear 72 in FIG. 2.)

In this case, the friction springs 76 are formed with an outer diameter dimension of the friction springs 76 when in a free state being larger than a diameter dimension of the inner periphery face of the main body portion 66A of the large diameter gear 66. The friction springs 76 are mounted onto the inner periphery face of the main body portion 66A of the large diameter gear 66 in a decreased-diameter state.

The above-described first exemplary embodiment has a structure in which the large diameter gear 66 that serves as the second rotating body is connected to the gear 64 at the motor 56 side and the small diameter gear 72 that serves as the first rotating body meshes with the gear 80 at the take-up spool 20 side. However the present invention is not to be limited thus. A structure is possible in which the first rotating body is connected to a rotation transmission member at the motor side and the second rotating body is connected to a rotation transmission member at the take-up spool side. The same applies to the other exemplary embodiments of the present invention that are described below.

Next, other exemplary embodiments of the present invention are described. Therein, structures and operations that are basically the same as in the first exemplary embodiment are assigned the same reference numerals as in the first exemplary embodiment and descriptions thereof are not given.

Second Exemplary Embodiment

Figure 5:
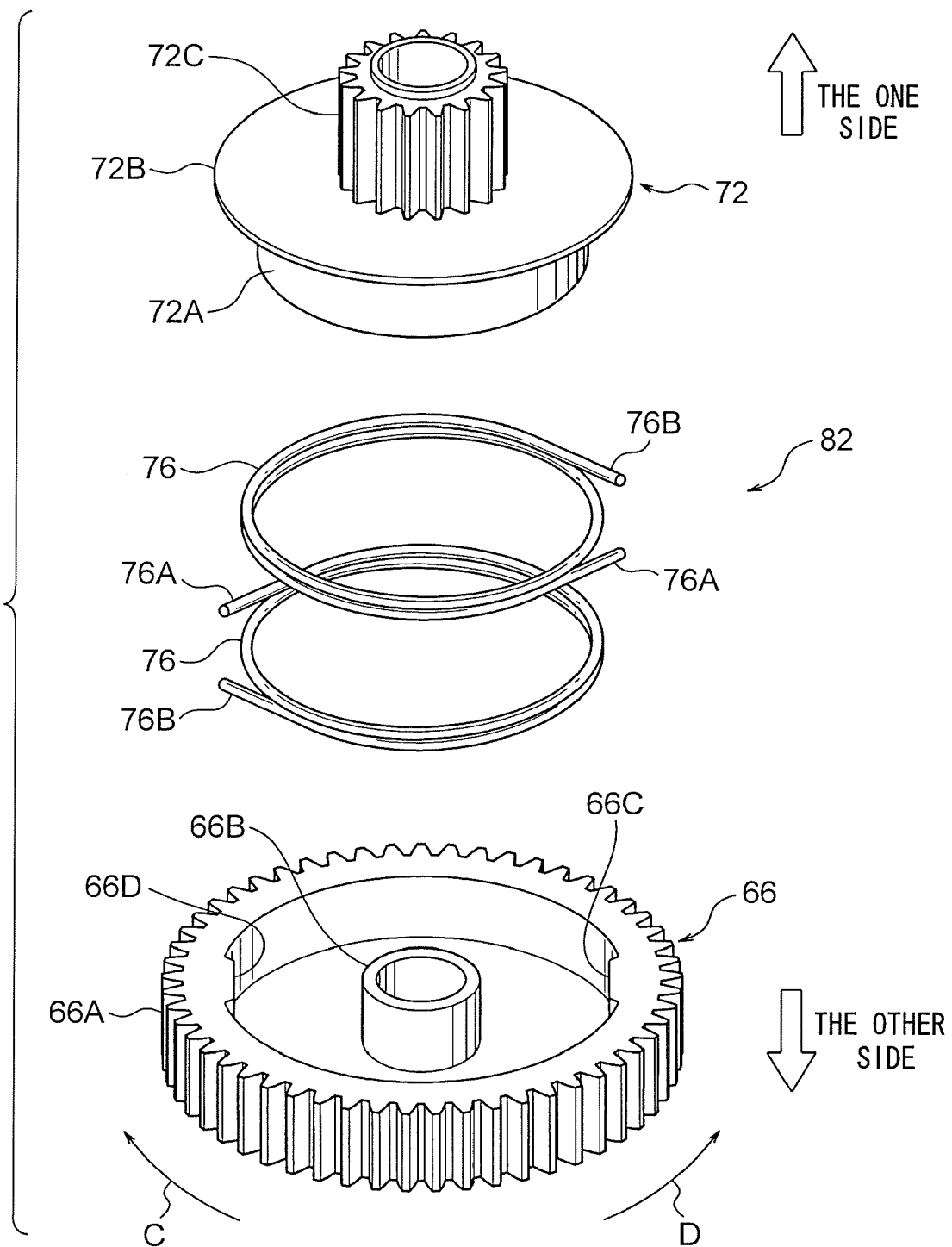
FIG. 5 is an exploded perspective diagram illustrating structure of an overload release mechanism that is a structural member of a webbing take-up device relating to a second exemplary embodiment of the present invention.
Figure 6:
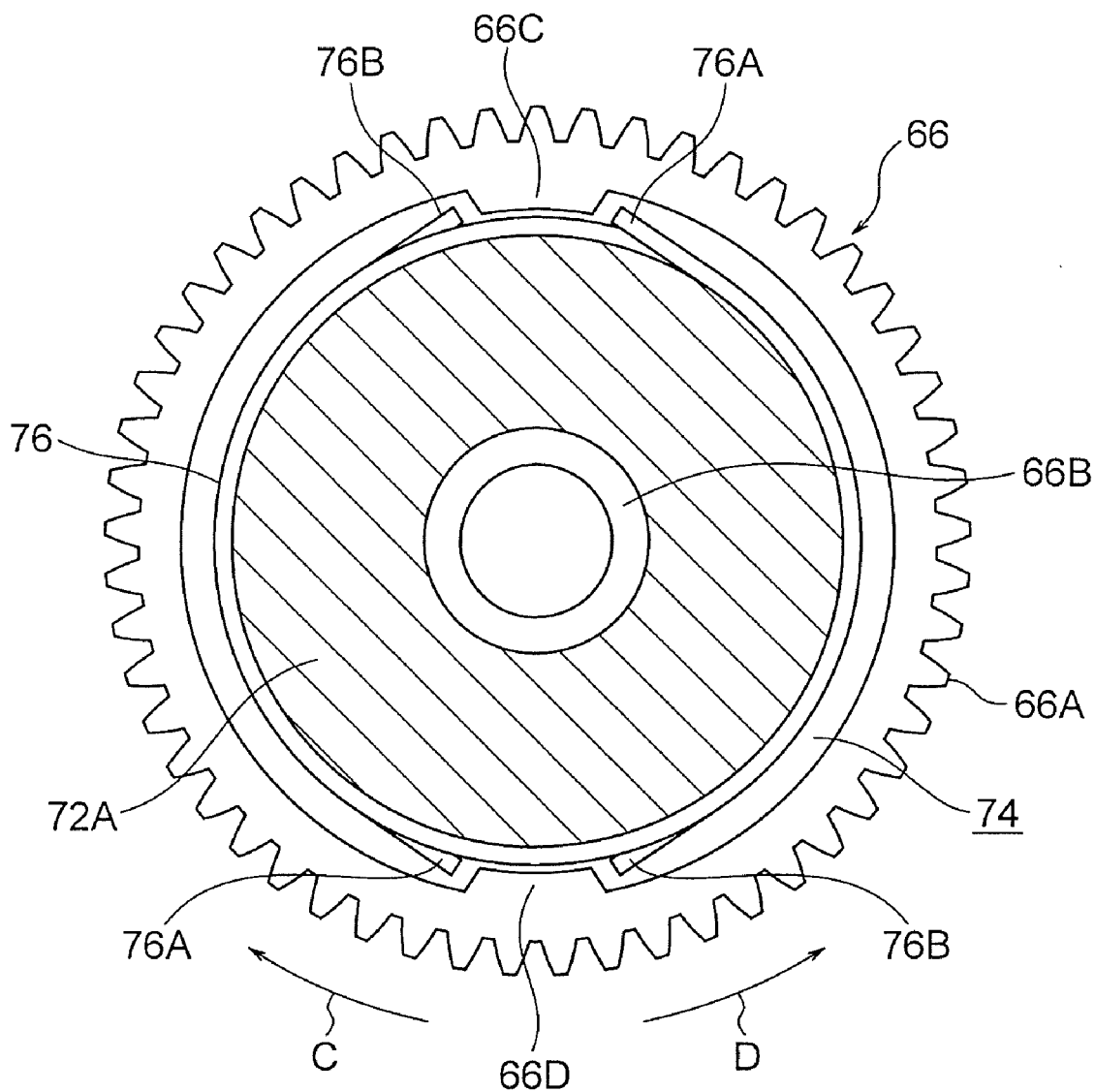
FIG. 6 is a sectional diagram of the overload release mechanism illustrated in FIG. 5.

FIG. 5 illustrates structure of an overload release mechanism 82, which is a structural member of a webbing take-up device relating to a second exemplary embodiment of the present invention, in an exploded perspective diagram. FIG. 6 illustrates the overload release mechanism 82 in a sectional diagram.

This overload release mechanism 82 has basically the same structure as the overload release mechanism 65 relating to the first exemplary embodiment. However, in this overload release mechanism 82, the two friction springs 76 are mounted onto the tubular portion 72A of the small diameter gear 72 in a state in which the respective circumferential direction one end portions 76A and circumferential direction other end portions 76B are arranged at opposite sides from one another. The protruding portion 66C provided at the large diameter gear 66 is disposed between the circumferential direction one end portion 76A and circumferential direction other end portion 76B of one of the friction springs 76, and a protruding portion 66D, provided at the large diameter gear 66, is disposed between the circumferential direction one end portion 76A and circumferential direction other end portion 76B of the other of the friction springs 76. This protruding portion 66D has the same structure as the protruding portion 66C, and the two protruding portions are disposed at mutually opposite sides of the large diameter gear 66 in the circumferential direction (sides that are opposite by 180°). That is, in this exemplary embodiment, a plural number (in this case, two) of the protruding portions 66C and 66D are assigned, one-to-one, to the plural number (in this case, two) of the friction springs 76. In the present exemplary embodiment, structures apart from the structure described above have the same constitutions as in the first exemplary embodiment.

In this exemplary embodiment, when the small diameter gear 72 relatively rotates with respect to the large diameter gear 66, the circumferential direction one end portion 76A or the circumferential direction other end portion 76B of the one friction spring 76 abuts against the protruding portion 66C of the large diameter gear 66, and the circumferential direction one end portion 76A or the circumferential direction other end portion 76B of the other friction spring 76 abuts against the protruding portion 66D of the large diameter gear 66. Therefore, a load (stress) inputted to the large diameter gear 66 from the two friction springs 76 is distributed between the protruding portion 66C and the protruding portion 66D. Hence, endurance of the large diameter gear 66 may be improved.

For the second exemplary embodiment described above, a case with two of the friction springs and of the protruding portions has been described. However, this is not to be limiting, and the numbers of friction springs and protruding portions may be suitably varied. How the plural protruding portions are assigned to the plural friction springs may be arbitrarily varied.

Third Exemplary Embodiment

Figure 7:
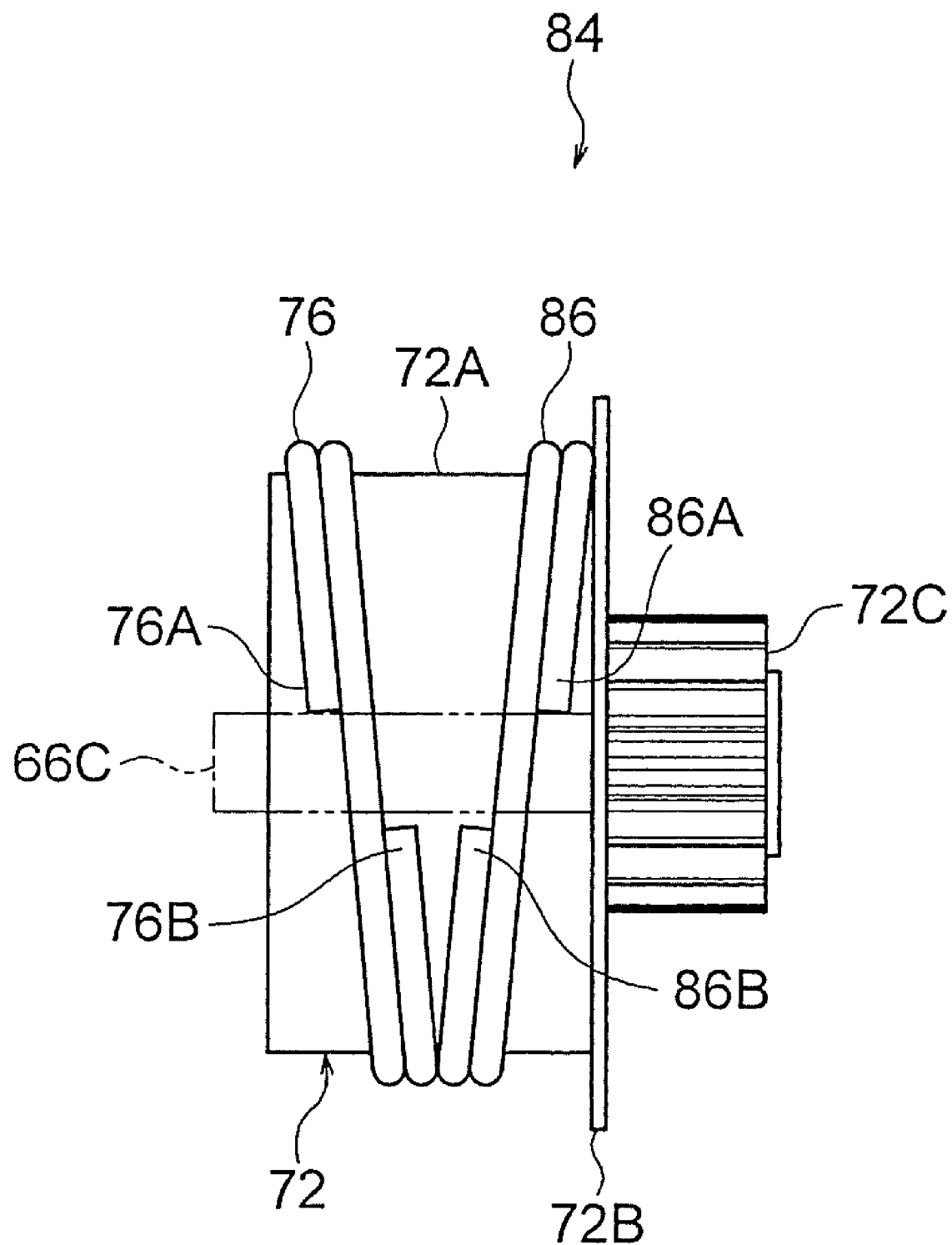
FIG. 7 is a side view illustrating partial structure of an overload release mechanism that is a structural member of a webbing take-up device relating to a third exemplary embodiment of the present invention.

FIG. 7 illustrates partial structure of an overload release mechanism 84, which is a structural member of a webbing take-up device relating to a third exemplary embodiment of the present invention, in a side view. This overload release mechanism 84 has basically the same structure as the overload release mechanism 65 relating to the first exemplary embodiment. However, in the overload release mechanism 84, two (a pair of) friction springs 76 and 86 (coil springs) that are mounted on the tubular portion 72A of the small diameter gear 72 have helix orientations thereof set to mutually opposite orientations.

The one friction spring 76 has the circumferential direction one end portion 76A disposed at one end side of the protruding portion 66C of the large diameter gear 66 (not illustrated in FIG. 7) and the circumferential direction other end portion 76B disposed at the other end side of the protruding portion 66C. The other friction spring 86 has a circumferential direction one end portion 86A disposed at the one end side of the protruding portion 66C of the large diameter gear 66 and a circumferential direction other end portion 86B disposed in the vicinity of the circumferential direction other end portion 76B of the one friction spring 76 and at the other end side of the protruding portion 66C. In the present exemplary embodiment, structures apart from the structures described above have the same constitutions as in the first exemplary embodiment.

In this exemplary embodiment, when the small diameter gear 72 relatively turns the one way around the axis with respect to the large diameter gear 66, the circumferential direction one end portions 76A and 86A of the friction springs 76 and 86 abut against the one end side of the protruding portion 66C, and relative rotation of the friction springs 76 and 86 with respect to the large diameter gear 66 is impeded. If the rotary force that acts between the large diameter gear 66 and the small diameter gear 72 is larger than the maximum static friction force that acts between the friction springs 76 and 86 and the tubular portion 72A, then the tubular portion 72A slides (rubs with friction) against the friction springs 76 and 86, and relative rotation of the small diameter gear 72 with respect to the large diameter gear 66 is allowed. At this time, forces in directions to approach one another act on the friction springs 76 and 86 due to the friction thereof against the outer periphery face of the tubular portion 72A. Therefore, the friction springs 76 and 86 may be closely contacted and forces acting on the two counteract. Therefore, mispositioning of the friction springs 76 and 86 in the axial direction relative to the small diameter gear 72 may be prevented.

Figure 8A:
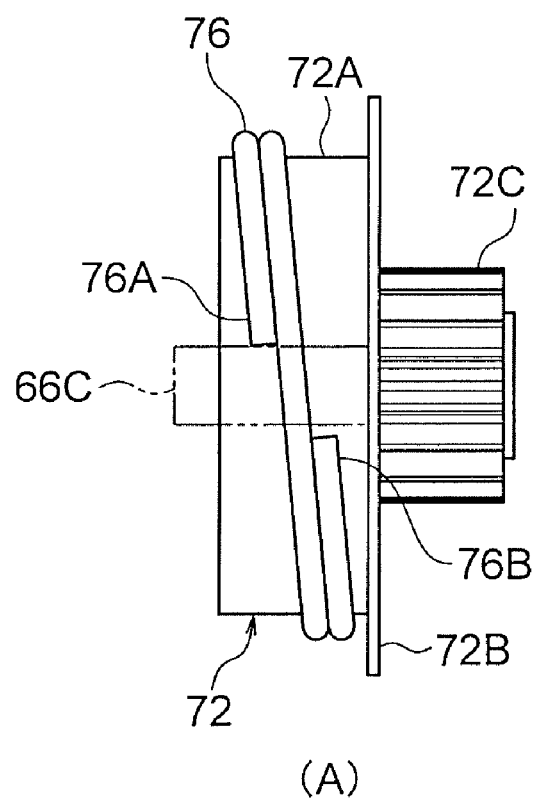
FIG. 8A is a side diagram illustrating a comparative example of the overload release mechanism relating to the third exemplary embodiment of the present invention.
Figure 8B:
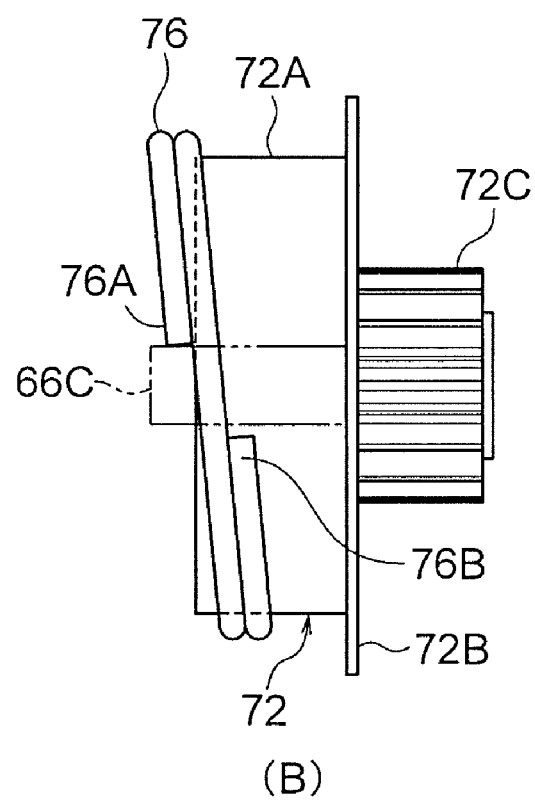
FIG. 8B is a side diagram illustrating a state in which a friction spring of the comparative example illustrated in FIG. 8A is mispositioned.

That is, as illustrated in FIG. 8A, if the small diameter gear 72 rotates relative to the friction spring 76 in a case where the helical friction spring 76 (coil spring) is mounted on the tubular portion 72A of the small diameter gear 72, the friction spring 76 is mispositioned in the axial direction of the small diameter gear 72 by a force component of the friction force that acts between the small diameter gear 72 and the friction spring 76 (see FIG. 8B). Thus, in the present exemplary embodiment, the pair of friction springs 76 and 86 whose helix orientations are set to mutually opposite orientations are closely contacted and the mispositioning actions counteract, and the above-mentioned problem may be solved.

In the exemplary embodiments described above, it has been described that the friction springs 76 and 86 are formed of wire-form spring members (with circular cross-sections). However, the present invention is not to be limited thus. The cross-sectional shapes of the friction springs 76 and 86 may be suitably changed.

Hereabove, exemplary embodiments have been offered as examples to describe the present invention, but the present invention is not to be limited by the above exemplary embodiments; numerous modifications may be embodied within a technical scope not departing from the spirit of the invention. Obviously, rights to the present invention are not to be limited to the above exemplary embodiments.

What is claimed is:

1. A webbing take-up device comprising:
   a take-up spool that takes up a webbing for vehicle occupant restraint;
   a motor; and
   an overload release mechanism that is interposed between the take-up spool and the motor,
   wherein the overload release mechanism includes:
   a first rotating body that is rotated interlockingly with one of the take-up spool or the motor;
   a second rotating body that is provided coaxially with the first rotating body and relatively rotatably with respect to the first rotating body, and that is rotated interlockingly with the other of the take-up spool or the motor, an inner periphery portion of the second rotating body opposing an outer periphery portion of the first rotating body; and
   a plurality of helical friction springs that are each formed by a spring member in an annular shape, that are disposed between the outer periphery portion of the first rotating body and the inner periphery portion of the second rotating body and side by side along an axial direction of the first and the second rotating bodies, that suppress relative rotation with respect to one of the first rotating body or the second rotating body by friction generated between the friction springs and the one of the first rotating body or the second rotating body, and that prevents relative rotation with respect to the other of the first rotating body or the second rotating body by engaging with the other of the first rotating body or the second rotating body,
   wherein the plurality of helical friction springs include a pair of coil springs, helix orientations of which are set to mutually opposite orientations, and the pair of coil springs receiving forces in directions approaching one another due to friction with the one of the first rotating body or the second rotating body during relative rotation in one direction around the axis with respect to the one of the first rotating body or the second rotation body.

2. The webbing take-up device of claim 1, wherein each of the friction springs is formed from a linear spring member.

3. A webbing take-up device comprising:
   a take-up spool that takes up a webbing for vehicle occupant restraint;
   a motor; and
   an overload release mechanism that is interposed between the take-up spool and the motor,
   wherein the overload release mechanism includes:
   a first rotating body that is rotated interlockingly with one of the take-up spool or the motor;
   a second rotating body that is provided coaxially with the first rotating body and relatively rotatably with respect to the first rotating body, and that is rotated interlockingly with the other of the take-up spool or the motor, an inner periphery portion of the second rotating body opposing an outer periphery portion of the first rotating body; and
   a plurality of helical friction springs that are each formed by a spring member in an annular shape, that are disposed between the outer periphery portion of the first rotating body and the inner periphery portion of the second rotating body and side by side along an axial direction of the first and the second rotating bodies, that suppress relative rotation with respect to one of the first rotating body or the second rotating body by friction generated between the friction springs and the one of the first rotating body or the second rotating body, and that prevents relative rotation with respect to the other of the first rotating body or the second rotating body by engaging with the other of the first rotating body or the second rotating body, wherein at least one protruding portion is provided at the other of the first rotating body or the second rotating body, the protruding portion protruding in a radial direction of the other of the first rotating body or the second rotating body and being disposable between one end portions in a circumferential direction of the friction springs and the other end portions in the circumferential direction of the friction springs.

4. The webbing take-up device of claim 3, wherein each of the friction springs is formed from a linear spring member.

5. A webbing take-up device comprising:

a take-up spool that takes up a webbing for vehicle occupant restraint:

a motor; and an overload release mechanism that is interposed between the take-up spool and the motor, wherein the overload release mechanism includes:

a first rotating body that is rotated interlockingly with one of the take-up spool or the motor:

a second rotating body that is provided coaxially with the first rotating body and relatively rotably with respect to the first rotating body, and that is rotated interlockingly with the other of the take-up spool or the motor, an inner periphery portion of the second rotating body opposing and outer periphery portion of the first rotating body; and a plurality of helical friction springs that are each formed by a spring member in an annular shape, that are disposed between the outer periphery portion of the first rotating body and the inner periphery portion of the second rotating body and side by side along an acial direction of the first and the second rotating bodies, that suppress relative rotation with respect to one of the first rotating body or the second rotating body and side by side along an axial direction of the first and the second rotating bodies, that suppress relative rotation with respect to one of the first rotating body or the second rotating body by friction generated between the friction springs and the one of the first rotating body or the second rotating body, and that prevents relative rotation with respect to the other of the first rotating body or the second rotating body by engaging with the other of the first rotating body or the second rotating body, wherein a plurality of protruding portions are provided at the other of the first rotating body or the second rotating body, the protruding portions protruding in radial directions of the other of the first rotating body or the second rotating body and being respectively disposable between one end portions in a circumferential direction of the friction springs and the other end portions in the circumferential direction of the friction springs.

6. The webbing take-up device of claim 5, wherein each of the friction springs is formed from a linear spring member.

7. A webbing take-up device comprising:

a take-up spool that takes up a webbing for vehicle occupant restraint;

a motor; and an overload release mechanism that is interposed between the take-up spool and the motor, wherein the overload release mechanism includes:

a first rotating body that is rotated interlockingly with one of the take-up spool or the motor;

a second rotating body that is provided coaxially with the first rotating body and relatively rotatably with respect to the first rotating body, and that is rotated interlockingly with the other of the take-up spool or the motor, an inner periphery portion of the second rotating body opposing an outer periphery portion of the first rotating body; and a helical friction spring that is formed by a spring member in an annular shape, that is disposed between the outer periphery portion of the first rotating body and the inner periphery portion of the second rotating body, that suppresses relative rotation with respect to one of the first rotating body or the second rotating body by friction generated between the friction spring and the one of the first rotating body or the second rotating body, and that prevents relative rotation with respect to the other of the first rotating body or the second rotating body by engaging with the other of the first rotating body or the second rotating body, wherein a plurality of friction springs can be disposed between the outer periphery portion of the first rotating body and the inner periphery portion of the second rotating body side by side along an axial direction of the first and the second rotating bodies, wherein at least one protruding portion is provided at the other of the first rotating body or the second rotating body, the protruding portion protruding in a radial direction of the other of the first rotating body or the second rotating body and being disposable between one end portion in a circumferential direction of the friction spring and the other end portion in the circumferential direction of the friction spring.

8. The webbing take-up device of claim 6, wherein the friction spring is formed from a linear spring member.

9. The webbing take-up device of claim 6, wherein relative rotation with respect to the other of the first rotating body or the second rotating body is prevented by the one end portion in the circumferential direction of the friction spring or the other end portion in the circumferential direction of the friction spring abutting against the at least one protruding portion.

* * * * *